United States Patent
Kim et al.

(10) Patent No.: US 11,277,444 B2
(45) Date of Patent: Mar. 15, 2022

(54) SYSTEM-ON-CHIP FOR PERFORMING VIRTUAL PRIVATE NETWORK FUNCTION AND SYSTEM INCLUDING THE SAME

(71) Applicant: Security Platform Inc., Gyeonggi-do (KR)

(72) Inventors: Kyung-mo Kim, Seoul (KR); Ho Gwan Kang, Seoul (KR)

(73) Assignee: SECURITY PLATFORM INC., Gyeonggi-Do (KR)

( * ) Notice: Subject to any disclaimer, the term of this patent is extended or adjusted under 35 U.S.C. 154(b) by 251 days.

(21) Appl. No.: 16/567,258

(22) Filed: Sep. 11, 2019

(65) Prior Publication Data
US 2020/0092328 A1 Mar. 19, 2020

(30) Foreign Application Priority Data
Sep. 19, 2018 (KR) .................. 10-2018-0112220

(51) Int. Cl.
*H04L 29/06* (2006.01)
*H04L 9/08* (2006.01)
*G06F 12/1081* (2016.01)

(52) U.S. Cl.
CPC ........ *H04L 63/166* (2013.01); *G06F 12/1081* (2013.01); *H04L 9/088* (2013.01); *H04L 9/0869* (2013.01); *H04L 63/0435* (2013.01); *H04L 63/0485* (2013.01); *H04L 63/0823* (2013.01); *G06F 2212/251* (2013.01)

(58) Field of Classification Search
CPC ..... H04L 63/166; H04L 9/0869; H04L 9/088; H04L 63/0435; H04L 63/0485; H04L 63/0823; G06F 12/1081; G06F 2212/251
See application file for complete search history.

(56) References Cited

U.S. PATENT DOCUMENTS

| | | | |
|---|---|---|---|
| 2015/0295713 A1* | 10/2015 | Oxford | H04L 9/0816 713/171 |
| 2017/0272945 A1* | 9/2017 | Link, II | H04L 9/3242 |

(Continued)

OTHER PUBLICATIONS

P. Urien "Introducing TLS/DTLS Secure Access Modules for IoT Frameworks: Concepts and Experiments", 2017, IEEE, 8 pages (Year: 2017).*

(Continued)

*Primary Examiner* — Catherine Thiaw
(74) *Attorney, Agent, or Firm* — Nath, Goldberg & Meyer; Jerald L. Meyer; Tanya E. Harkins (57) ABSTRACT

Provided is a system-on-chip that may perform a message encryption operation based on a transport layer security (TLS) scheme. The system-on-chip may include an authentication unit configured for exchanging a key used for the message encryption operation and performing authentication for a subject to perform communication, an advanced encryption standard (AES) engine core configured for performing a function of encrypting a message using a key or decrypting the encrypted message and a function of encrypting the key or decrypting the encrypted key, and a controller configured for controlling the AES engine core and the authentication unit based on a real time operating system (RTOS) and firmware for performing the message encryption operation.

14 Claims, 7 Drawing Sheets

(56) References Cited

U.S. PATENT DOCUMENTS

2019/0109848 A1* 4/2019 Clark .................. H04L 63/1441
2020/0322148 A1* 10/2020 McGough ............... H04L 9/083

OTHER PUBLICATIONS

Kun Li, Michael Maass, and Mike Ralph "A type-safe, TPM backed TLS infrastructure", 2012, 16 pages http://www.cs.cmu.edu/~mmaass/tpm_tls/report.html (Year: 2012).*

Xueyang Wang, Charalambos Konstantinou, Michail Maniatakos, Ramesh Karri "ConFirm: Detecting Firmware Modifications in Embedded Systems using Hardware Performance Counters", 2015, IEEE, pp. 544-551 (Year: 2015).*

Mohamad Badra, Ibrahim Hajjeh "Enabling VPN and Secure Remote Access using TLS Protocol", 2015, IEEE, pp. 308-314 (Year: 2006).*

\* cited by examiner

SYSTEM-ON-CHIP FOR PERFORMING VIRTUAL PRIVATE NETWORK FUNCTION AND SYSTEM INCLUDING THE SAME

BACKGROUND OF THE INVENTION

Field of the Invention

The present invention relates to an electronic device, and more particularly to a system-on-a-chip for performing a virtual private network function and a system including the same.

Related Art

Security threats in an Internet of Things (IoT) device are increasing day by day. For example, an artificial intelligence robot cleaner may be exposed to an Internet-based hacking threat or a risk that a user's house may be monitored using a built-in camera. Further, the camera may be exposed to a risk that a photo or video may be transmitted to an attacker's server or a risk of being remotely controlled via a network to shoot the photo or video at will of the attacker. In addition, a digital door lock may be exposed to a risk of being opened and closed at will of the attacker due to an extortion of a control function. Therefore, a security enhancement issue is emerging in an IoT device.

A virtual private network (hereinafter, VPN) was developed as a private network that is used by a company or an organization to communicate without disclosing contents to outside. The VPN may form a secure channel between devices using a special TCP/IP-based protocol called a tunneling protocol. In the VPN, a message may be delivered using a standard protocol over a public network such as the Internet, or may be delivered, after a VPN service provider and a customer make a service level contract, via a private network of the service provider.

The VPN may be implemented as a software application or hardware running on a commercial/general purpose operating system such as Windows or Linux. Since the VPN uses various encryption algorithms, key exchange protocols, hash algorithms, or the like having high level of complexity, the VPN results in a lot of overhead. Therefore, the VPN was restrictedly used because the VPN is only able to operate in a computing environment with a high-end processor and memory.

SUMMARY OF THE INVENTION

A miniaturized system-on-chip (hereinafter, SoC) that performs a VPN function may be provided. A SoC based on micro controller unit (hereinafter, MCU) is mounted on an electronic device to implement a VPN tunnel, so that security of the electronic device may be greatly improved.

The technical problems to be solved by the present embodiment are not limited to the aforementioned problems, and any other technical problems may be deduced from the following embodiments.

In a first aspect, a system-on-chip for performing a message encryption operation based on a transport layer security (TLS) is provided. The system-on-chip includes an authentication unit configured for exchanging a key used for the message encryption operation and performing authentication for a subject to perform communication, an advanced encryption standard (AES) engine core configured for performing a function of encrypting a message using a key or decrypting the encrypted message and a function of encrypting the key or decrypting the encrypted key, and a controller configured for controlling the AES engine core and the authentication unit based on a real time operating system (RTOS) and firmware for performing the message encryption operation.

In one implementation, the authentication unit may include a circuit configured for performing an elliptic curve digital signature algorithm (ECDSA) and a Rivest Shamir Adleman (RSA) algorithm.

In one implementation, the system-on-chip may further include a random number generator configured for generating a random number used for the message encryption operation, a hash unit configured for hashing the message or the key, and private key storage configured for storing a private key.

In one implementation, the system-on-chip may further include a micro controller unit (MCU) including the AES engine core, the random number generator, and the hash unit, and a trusted platform module (TPM) including the authentication unit and the private key storage.

In one implementation, the system-on-chip may further include a memory, and the RTOS, the firmware, and a software application for receiving an X.509 certificate are stored in the memory.

In one implementation, the firmware may include a code or a function for replacing signal delivery performed in a commercial or general-purpose operating system for the message encryption operation with message delivery in the RTOS.

In one implementation, information about a physical or logical address indicating a memory region at which a file is capable of being input or output may be contained in the firmware.

In a second aspect, an electronic device including the system-on-chip is provided.

In a third aspect, a system for transmitting a message through a virtual private network is provided. The system includes a client device configured for generating the message, a VPN client configured for performing an encryption operation based on a TLS on a message received from the client device through a communication channel to output an encapsulated message, a VPN server configured for receiving the encapsulated message from the VPN client through the VPN tunnel and for decrypting the encapsulated message, and a server configured for receiving the decrypted message from the VPN server, wherein the VPN client includes a system-on-chip for performing the encryption operation based on the TLS based on a real time operating system (RTOS) and firmware.

In one implementation, the system-on-chip may include a micro controller unit (MCU), wherein the MCU may include an advanced encryption standard (AES) engine core configured for performing a function of encrypting a message using a key or decrypting the encrypted message and a function of encrypting the key or decrypting the encrypted key, a random number generator configured for generating a random number used for the encryption operation based on the TLS, and a hash unit configured for hashing the message or the key.

In one implementation, the system-on-chip may further include a trusted platform module (TPM), wherein the TPM may include a circuit configured for performing an elliptic curve digital signature algorithm (ECDSA) and a Rivest Shamir Adleman (RSA) algorithm, and private key storage configured for storing a private key.

In one implementation, the communication channel may include at least one of an Ethernet, a long term evolution (LTE), a universal serial bus (USB), or a wireless fidelity (WIFI).

In one implementation, the VPN client may be embedded in the client device.

In one implementation, the VPN client may be an Internet of Things device.

In one implementation, the firmware may include a code or a function for replacing signal delivery performed in a commercial or general-purpose operating system for the encryption operation based on the TLS with message delivery in the RTOS.

In one implementation, information about a physical or logical address indicating a memory region at which a file is capable of being input or output may be included in the firmware.

DESCRIPTION OF EXEMPLARY EMBODIMENTS

In the following, some embodiments will be described in detail and with reference to the accompanying drawings in order that those skilled in the art to which the present invention belongs may easily implement the present invention.

A term "unit" used herein may refer to a hardware component, a collection of hardware components, and/or a circuit, such as a field-programmable gate array (FPGA) or application specific integrated circuit (ASIC).

A TCP/IP (Transmission Control Protocol/Internet Protocol) communication protocol is a protocol of dividing a message exchanged between computers into an appropriate size so that no error occurs and receiving again the transmitted message to convert the message into original information.

A transport layer security (hereinafter, TLS) is a technology in which a secure sockets layer (SSL) is standardized to authenticate parties with certificates on the Internet and to provide confidentiality and integrity. TLS may provide a security function to the TCP/IP communication network. The TLS may include a first step of exchanging supportable algorithms with each other, a second step of performing encryption key exchange and authentication, and a third step of encrypting a message with a symmetric key cipher, authenticating the message, and outputting the message.

Figure 1:
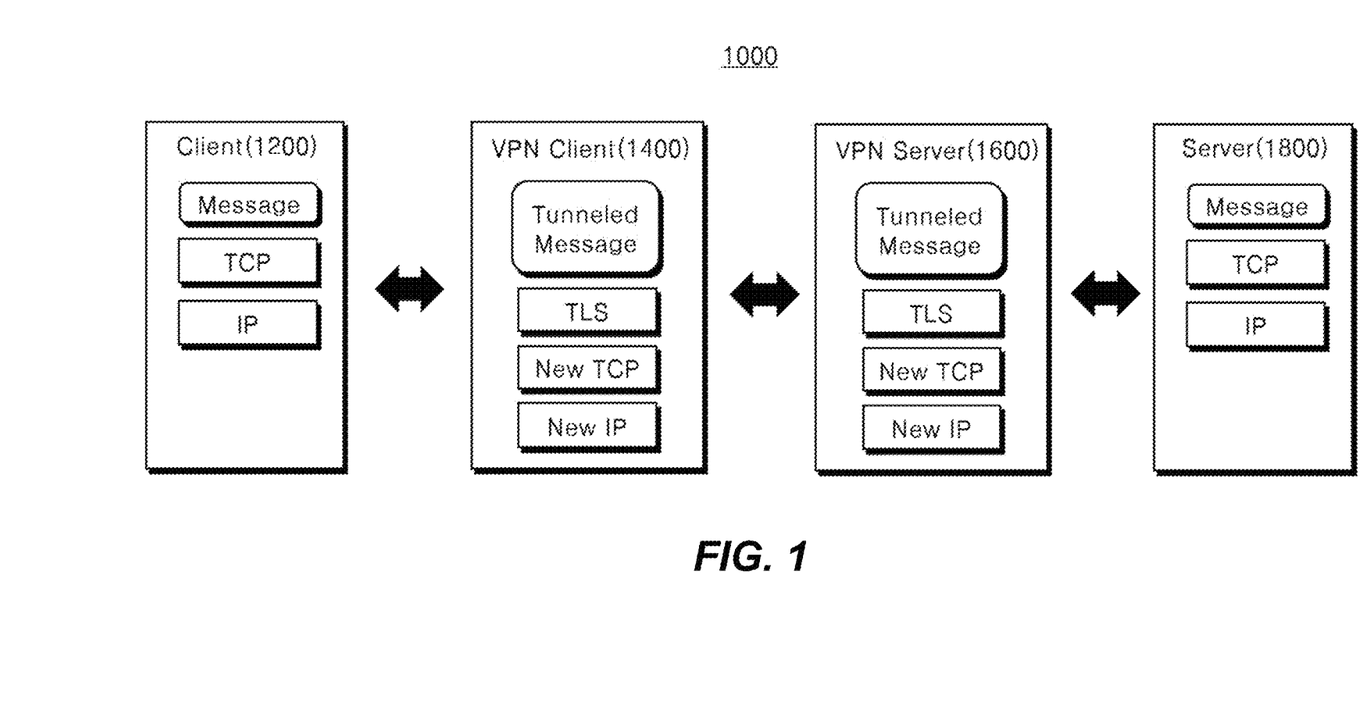
FIG. 1 illustrates a VPN implemented based on a transport layer security in a TCP/IP network according to an embodiment.

FIG. 1 illustrates a VPN implemented based on a transport layer security in a TCP/IP network according to an embodiment.

Referring to FIG. 1, a system 1000 may include a client 1200, a VPN client 1400, a VPN server 1600, and a server 1800.

The client 1200 may mean a device for performing communication to exchange the messages based on the TCP/IP protocol. According to one embodiment, the client 1200 may include an electronic device such as a computer, a smart phone, a wearable device, a camera, a camcorder, a TV, various meters (a power meter, a gas meter, a water meter, or the like), an ATM device, a POS terminal, a black box for a vehicle, an IoT device, and the like, but is not limited thereto.

According to one embodiment, the client 1200 and the server 1800 may be servers of a power meter positioned in the home and a power supplier, respectively. The server of the power supplier may calculate a charge for supplied power based on data received from each power meter positioned in each home and impose the calculated charge.

According to one embodiment, the client 1200 may be an IoT device and the server 1800 may be another IoT device or a server that collects data from the IoT device. Each of the client 1200 and the server 1800 has an accessible wired or wireless interface and may communicate with another at least one device via the wired or wireless interface to transmit or receive the data.

According to one embodiment, the client 1200 may be an IP (Internet Protocol) camera and the server 1800 may be a server managed by a government or public institution that collects image data from the IP camera.

A VPN may be applied to the system 1000 to enhance security in the TCP/IP communication. Referring to FIG. 1, the VPN client 1400 and the VPN server 1600 to form a VPN tunnel may be positioned between the client 1200 and the server 1800. The VPN client 1400 and the VPN server 1600 may encrypt the message based on a TLS scheme and transmit the encrypted message through the VPN tunnel. According to one embodiment, the VPN client 1400 may refer to a hardware module positioned inside the client 1200. Alternatively, the VPN client 1400 may refer to an electronic device (electronic equipment) positioned outside the client 1200 or a hardware module included in the electronic device.

First, in the step of exchanging the supportable algorithms with each other, the VPN client 1400 and the VPN server 1600 may exchange cipher suites. In this step, the encryption method, message authentication code (MAC) to be used for key exchange and authentication can be determined. The message authentication codes may be generated by an HMAC hash functions.

In the key exchange and authentication step, key exchange and authentication algorithms may use a public key scheme or a pre-shared key (TLS-PSK). According to one embodiment, the key exchange algorithm may include Rivest Shamir Adleman (RSA), Diffie-Hellman, Elliptic-curve Diffie-Hellman (ECDH), secure remote password (SRP), and pre-shared key (PSK) algorithms. The authentication algorithm according to one embodiment may include the RSA algorithm, a digital signature algorithm (DSA), and an elliptic curve digital signature algorithm (ECDSA).

In the message encryption and authentication step, RC4, triple DES (Data Encryption Standard), AES (Advanced Encryption Standard), IDEA (International Data Encryption Algorithm), DES, Camellia algorithms may be used as the symmetric key encryption algorithm. The hash function according to one embodiment may use an HMAC-MD5 or HMAC-SHA algorithm. The message authentication codes may be generated by the hash function.

Each of the VPN client 1400 and the VPN server 1600 may include a new TCP and a new IP for transmitting and receiving the encrypted message based on the TLS scheme. The new TCP and IP may refer to a protocol stack used in the VPN tunnel formed based on the TLS scheme.

According to one embodiment, in order to implement a VPN function, a commercial/general-purpose operating system such as Windows or Linux may be mounted in each of the VPN client 1400 and the VPN server 1600. As described above, the operations for implementing the VPN function are high in complexity and require high memory usage. Thus, the operations for implementing the VPN function may be used under a management of an operating system in a computing environment with a high-end processor and a memory. In this case, the VPN client 1400 and the VPN server 1600 may be produced in a form of a software application operating in the commercial/general-purpose operating system or a hardware module operated by the commercial/general-purpose operating system. In this embodiment, the VPN server 1600 may include a cloud and an open source VPN server. In addition, the VPN server 1600 may include a commercial VPN gateway.

Hereinafter, a SoC for solving a security threat that may occur in a miniaturized and lightweight electronic device in which the commercial/general-purpose operating system is not installed, such as the IoT device and the wearable device, or the like is disclosed.

Figure 2:
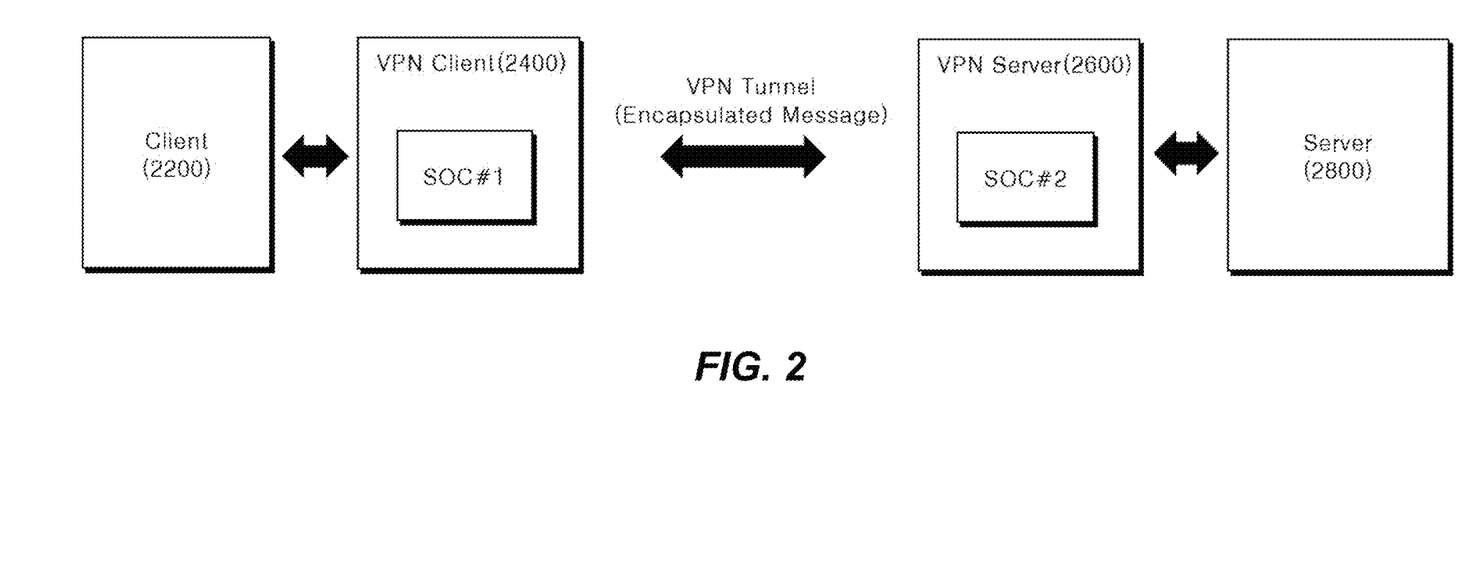
FIG. 2 illustrates a secure channel formed using a SoC in which a VPN function is embedded, according to one embodiment.

FIG. 2 illustrates a secure channel formed using a SoC in which a VPN function is embedded, according to one embodiment.

A client 2200, a VPN client 2400, a VPN server 2600, and a server 2800 in FIG. 2 may respectively correspond to the client 1200, the VPN client 1400, the VPN server 1600, and the server 1800 in FIG. 1. Therefore, even though omitted below, the contents described above regarding the client 1200, the VPN client 1400, the VPN server 1600, and the server 1800 in FIG. 1 may be applied to the client 2200, VPN the client 2400, the VPN server 2600, and the server 2800 in FIG. 2.

According to one embodiment, the VPN client 2400 may be positioned inside or outside the client 2200. The VPN client 2400 may receive a message from the client 2200 through a communication path. The communication channel may include a wired/wireless interface such as Ethernet, long term evolution (LTE), universe serial bus (USB), or wireless fidelity (WIFI).

The VPN client 2400 may include a power supply for powering the VPN client 2400. For example, when the VPN client 2400 is positioned outside the client 2200, the VPN client 2400 may include the power supply for powering the VPN client 2400. According to one embodiment, as a component for connecting the VPN client 2400 to the client 2200 that has been supplied power from a POE (Power Over Ethernet), a POE bypass (Power Over Ethernet Bypass) may be embedded in the VPN client 2400 in order for the VPN client 2400 to receive the power supplied from the POE instead of the client 2200 and to supply the supplied power to the client 2200. When the VPN client 2400 is positioned inside the client 2200, the VPN client 2400 may receive necessary power from a power supply embedded in the client 2200 without a separate power supply.

The VPN client 2400 may encrypt the message received from the client 2200 and encapsulate the encrypted message to transmit the encapsulated message to the VPN server 2600 through the VPN tunnel. The VPN server 2600 may decrypt the encapsulated message received through the VPN tunnel and transmit the decrypted message to the server 2800.

According to another embodiment, the VPN server 2600 may encrypt the message received from the server 2800 and encapsulate the encrypted message to transmit the encapsulated message to the VPN client 2400 through the VPN tunnel. The VPN client 2400 may decrypt the encapsulated message received through the VPN tunnel and transmit the decrypted message to the client 2200.

At least one of the VPN client 2400 and the VPN server 2600 may include a SoC in which a VPN function that may realize, at a very low price and in a very light weight, a security technology such as a random number, a password, an authentication, a hash, or the like based on a micro controller unit (MCU) equipped with a security engine is embedded.

First, the VPN client 2400 may include a first SoC (SoC #1) for implementing the VPN function (or for forming the VPN tunnel). The first SoC (SoC #1) may perform an operation of encrypting the message based on the TLS scheme or decrypting the encapsulated message.

The first SoC (SoC #1) may include at least one MCU including a security module. The first SoC (SoC #1) may utilize the at least one MCU including the security module to form the VPN tunnel in an environment (for example, the IoT device) where there is no operating system such as the Linux or the Windows. An MCU based on a Coretex-M developed by ARM may be used for the first SoC (SoC #1). For example, the first SoC (SoC #1) may include an STM32 MCU developed by STMicroelectronics but is not limited thereto.

The encapsulated message output by the VPN client 2400 may be transmitted to the VPN server 2600. The VPN server 2600 may receive the encapsulated message from the VPN client and decrypt the encapsulated message. The VPN server 2600 may include a second SoC (SoC #2) for implementing the VPN function as well. The second SoC (SoC #2) mounted on the VPN server 2600 is the same as the first SoC (SoC #1) mounted on the VPN client 2400, and thus a detailed description thereof will be omitted.

FIG. 2 shows that the VPN server 2600 includes the second SoC (SoC #2) for implementing the VPN function like the VPN client 2400. However, the VPN server 2600 may not include the second SoC (SoC #2) but include a software application or a hardware module managed by the commercial/general-purpose operating system such as the Linux or the Windows for implementing the VPN function. That is, the VPN client 2400 may implement the VPN function with the first SoC (SoC #1) but the VPN server 2600 may implement the VPN function by including VPN software or hardware in a manner managed by the commercial/general-purpose operating system such as the Linux or the Windows. In contrast, the VPN server 2600 may implement the VPN function with the second SoC (SoC #2) but the VPN client 2400 may implement the VPN function by including the VPN software or hardware in a manner managed by the commercial/general-purpose operating system such as the Linux or the Windows.

Figure 3:
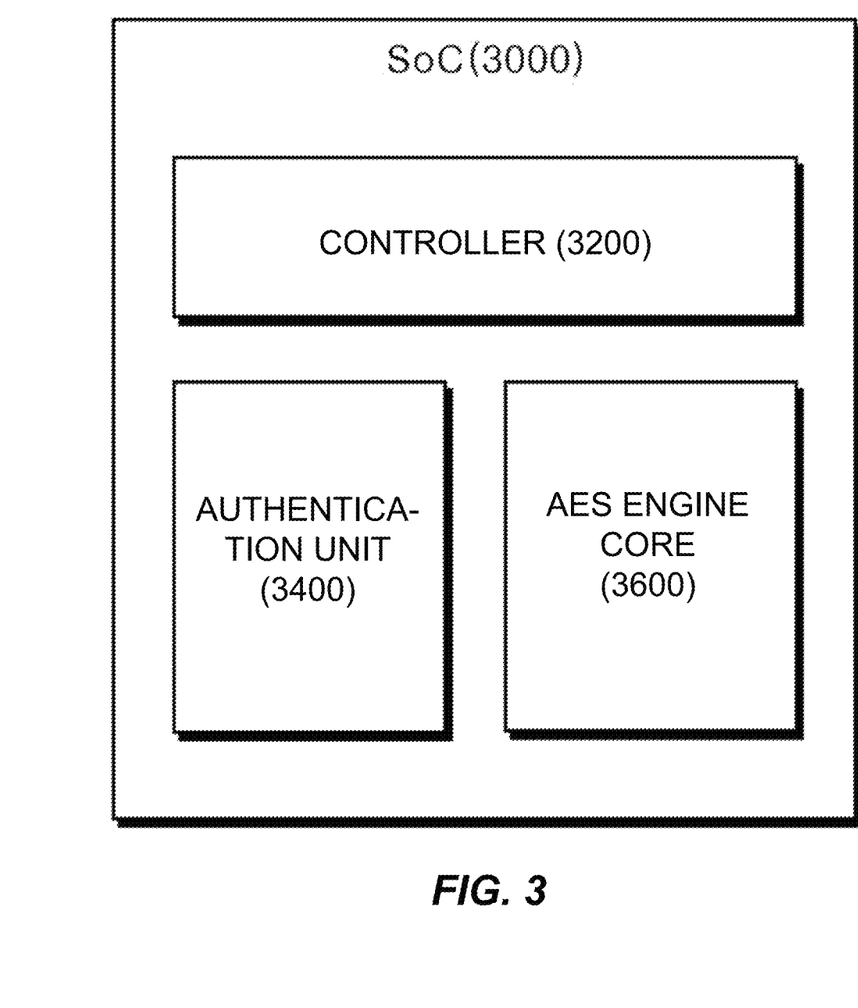
FIG. 3 illustrates a block diagram of a SoC for implementing a VPN function, according to one embodiment.

FIG. 3 illustrates a block diagram of a SoC for implementing a VPN function, according to one embodiment.

A SoC 3000 in FIG. 3 may represent a block diagram of one of the first SoC (SoC #1) and the second SoC (SoC #2)

in FIG. 2. Referring to FIG. 3, the SoC 3000 may include a controller 3200, an authentication unit 3400, and an AES (Advanced Encryption Standard) engine core 3600.

The controller 3200 may control overall operations of the SoC 3000 to perform a TLS-based message encryption operation. According to one embodiment, the controller 3200 may include a processor core such as a central processing unit (CPU) in the MCU. The controller 3200 may control other components of the SoC 3000 based on firmware installed in each of a RTOS (Real Time Operating System) and the SoC 3000 to perform the TLS-based encryption operation.

The authentication unit 3400 may exchange a key used for the encryption and perform an authentication on a subject performing the communication. The authentication unit 3400 may perform the authentication based on a signature algorithm such as an Elliptic Curve Digital Signature Algorithm (ECDSA) or a Rivest Shamir Adleman (RSA) algorithm. The signature algorithm, also referred to as a public key algorithm, may be used for operations to issue a certificate using a pair of a private key and a public key and authenticate an identity of a communication party.

According to one embodiment, a trusted platform module (hereinafter, TPM), which is a kind of a cryptographic chip, may be included in the SoC 3000 to implement the authentication unit 3400. The TPM is a microprocessor that is integrated with a gateway's system hardware to perform password-related tasks such as generating and storing a password. The TPM may perform a hardware-based security operation such as protecting small, sensitive information such as a password, data for software booting, or the like. The TPM included in the SoC 3000 may include a circuit configured for performing the ECDSA algorithm and the RSA algorithm. The TPM included in the SoC 3000 may perform a high-complexity operation or an operation requiring a large amount of memory required for the TLS-based message encryption operation.

The AES engine core 3600 may perform a function of encrypting the message using a key or decrypting the encrypted message and a function of encrypting the key or decrypting the encrypted key. In a first party and a second party sharing the same encryption key with each other, a message encrypted by the first party may be decrypted by the second party. However, a third party that does not have the encryption key may not be able to decrypt the message.

According to one embodiment, an MCU equipped with a circuit configured for performing the AES algorithm may be included in the SoC 3000 to implement the AES engine core 3600.

According to one embodiment, the MCU and the TPM may be connected via a printed circuit board. In such a case, the SoC 3000 may be in a form of the printed circuit board.

Figure 4:
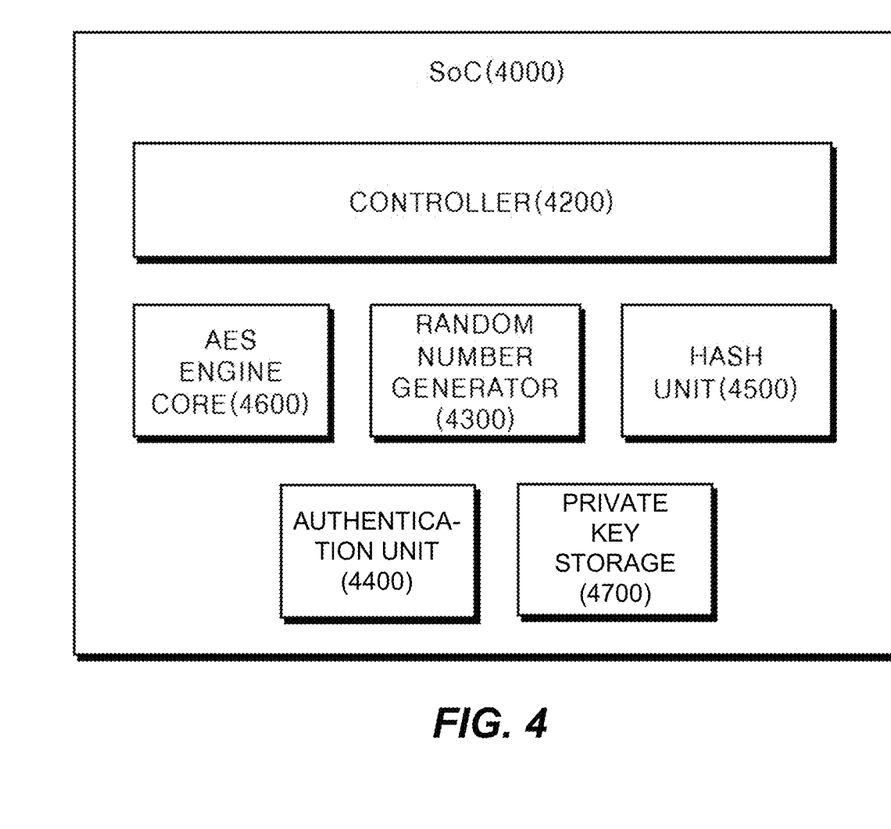
FIG. 4 illustrates a block diagram of a SoC for implementing a VPN function, according to one embodiment.

FIG. 4 illustrates a block diagram of a SoC for implementing a VPN function, according to one embodiment.

A SoC 4000 in FIG. 4 represents an additional embodiment of the SoC 3000 in FIG. 3. A controller 4200, an authentication unit 4400, and an AES engine core 4600 of the SoC 4000 may respectively correspond to the controller 3200, the authentication unit 3400, and the AES engine core 3600 of the SoC 3000 in FIG. 3.

Referring to FIG. 4, the SoC 4000 may further include a random number generator 4300, a hash unit 4500, and a private key storage 4700.

The random number generator 4300 may generate a random number needed for the encryption operation. The generated random number may include a deterministic random number and an indeterminate random number. The indeterminate random number may be treated as an intrinsic random number. According to one embodiment, the random number generator 4300 may include a hardware circuit in which an algorithm for generating a random number using a seed is implemented. According to one embodiment, an MCU equipped with a random number generating module may be included in the SoC 4000 to implement the random number generator 4300.

The hash unit 4500 may perform a hash algorithm. The hash unit 4500 may hash the message, the public key, or the private key using a SHA (Secure Hash Algorithm) such as a SHA-1 and a SHA-2. For example, the hash unit 4500 may hash an original message to produce a 32-byte long summary value. According to one embodiment, different messages may be hashed into different summary values. In such a case, even though a portion (e.g., 1 bit) of the original messages is different, the summary value may exhibit a very large difference. According to one embodiment, an MCU with the hash module may be included in the SoC 4000 to implement the hash unit 4500.

The private key storage 4700 is a memory space for storing the private key. The private key is required to perform the encryption algorithm. In order to encrypt the message without exposing the private key, it is important to store the private key unexposed. According to one embodiment, a TPM equipped with a space for storing the private key may be included in the SoC 4000 to implement the private key storage 4700.

Figure 5:
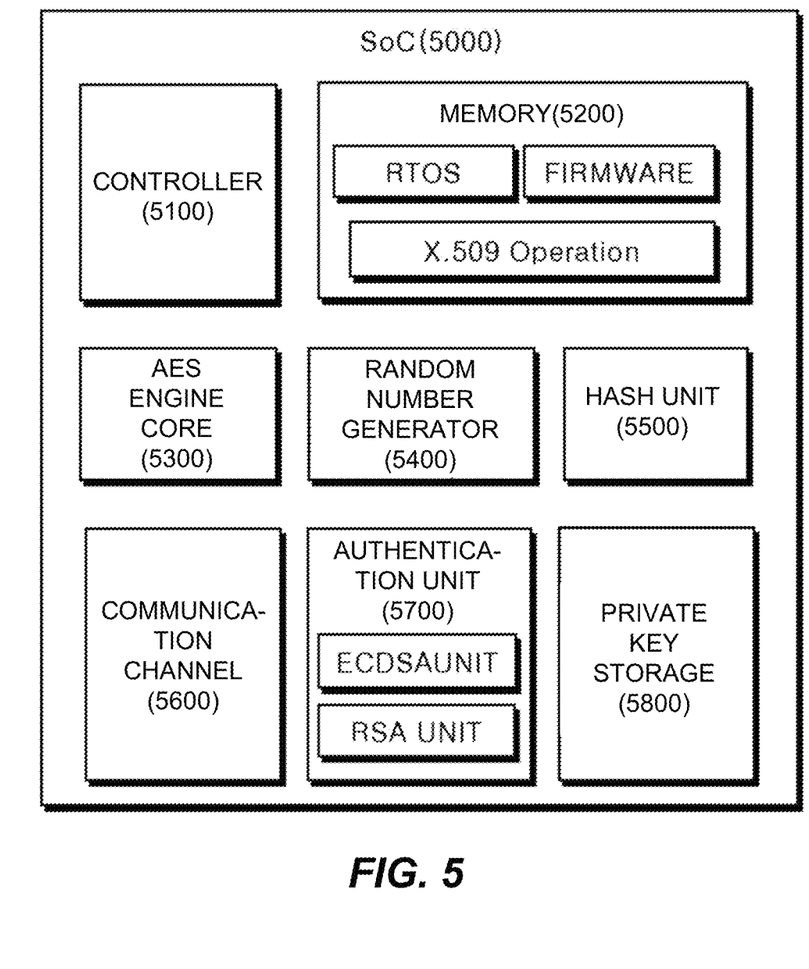
FIG. 5 illustrates a detailed block diagram of a SoC for implementing a VPN function, according to one embodiment.

FIG. 5 illustrates a detailed block diagram of a SoC for implementing a VPN function, according to one embodiment.

A SoC 5000 in FIG. 5 represents an additional embodiment of the SoC 4000 in FIG. 4. A controller 5100, an AES engine core 5300, a random number generator 5400, a hash unit 5500, an authentication unit 5700, and a private key storage 5800 of the SoC 5000 may respectively correspond to the controller 4200, the AES engine core 4600, the random number generator 4300, the hash unit 4500, the authentication unit 4400, and the private key storage 4700 of the SoC 4000 shown in FIG. 4.

Referring to FIG. 5, the memory 5200 may store a set of instructions for performing an RTOS, firmware, and an X.509 operation. The X.509 operation refers to an operation of issuing a certificate from a certification authority (CA). Further, the X.509 operation may perform a role of dividing the public key and the private key. According to one embodiment, the memory 5200 may include a volatile memory such as a dynamic random access memory (DRAM) and a static random access memory (SRAM) and a non-volatile memory such as a flash memory, a read only memory (ROM), a phase-change random access memory (PRAM), a magnetic random access memory (MRAM), a resistive random access memory (ReRAM), and a ferroelectrics random access memory (FRAM).

As described above, the SoC 5000 in FIG. 5 operates in an environment where no commercial/general-purpose operating system such as Linux, Windows, IOS, and Android is installed. Therefore, the SoC 5000 may perform the TLS-based encryption operation based on the installed firmware such as the RTOS. Thus, according to one embodiment, signal delivery in the commercial/general-purpose operating system necessary for implementing the VPN function may be replaced with message delivery in the RTOS of the SoC 5000. For example, the firmware may include a code or a function for replacing the signal delivery in the commercial/general-purpose operating system with the message delivery in the RTOS. Further, the SoC 5000 may be configured to allow a file input/output only at a specified memory location within the SoC 5000 in order to replace a file input/output (or a file system) in the commercial/general-purpose operating system necessary for implementing the VPN function. For example, the firmware may record information about a physical or logical address indicating a memory region at which the file input/output may be performed.

The controller 5100 may perform the TLS-based encryption operation by controlling the components 5200, 5300, 5400, 5500, 5600, 5700, and 5800 in the SoC 5000 based on the RTOS and the firmware. The communication channel 5600 may refer to a wired/wireless interface for performing an operation for receiving the original message from an outside (e.g., the client 2200 in FIG. 2), an operation of encrypting the original message and outputting the encapsulated message (i.e., the encrypted message) to an outside (e.g., the VPN server 2600 in FIG. 2), an operation of receiving the encapsulated message (i.e., the encrypted message) from the outside (e.g., the VPN server 2600 in FIG. 2), and an operation of decrypting the encapsulated message and transmitting the decrypted message to an outside (e.g., the client 2200 in FIG. 2).

For example, the communication channel 5600 may include a modem communication interface or the like connectable to an Ethernet and a Universal Serial Bus (USB), a Local Area Network (LAN), a wireless local area network (WLAN) such as a Wireless Fidelity (WIFI), a wireless personal area network (WPAN) such as a Bluetooth, a mobile cellular network such as a Zigbee, a Near Field Communication (NFC), a Radio Frequency Identification (RFID), a Power Line Communication (PLC), or a 3G (3rd Generation), a 4G (4th Generation), an LTE (Long Term Evolution), or the like.

Figure 6:
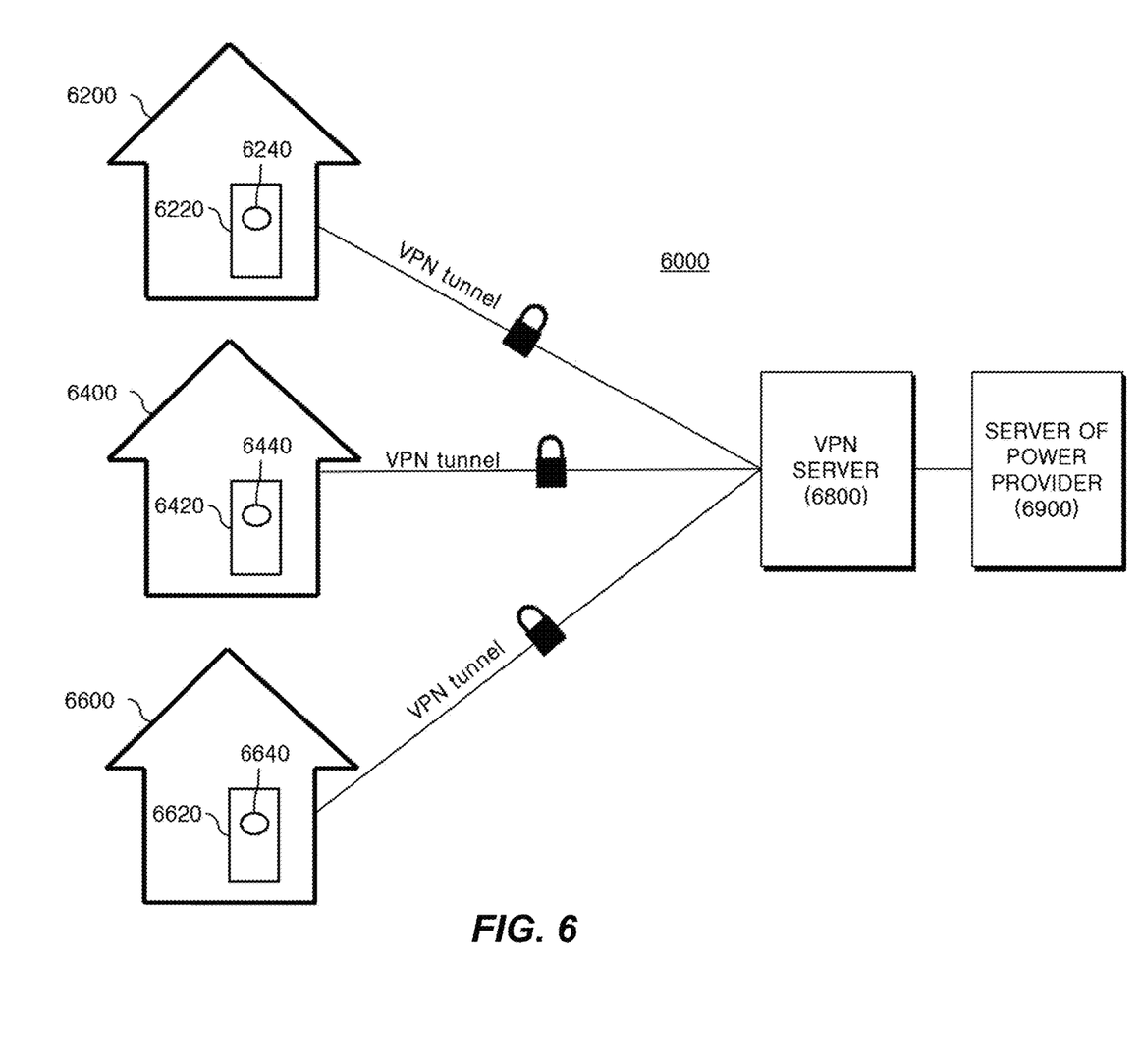
FIG. 6 illustrates a system including an electronic device in which a SoC of FIGS. 2 to 5 is embedded, according to one embodiment.

FIG. 6 illustrates a system including an electronic device in which a SoC of FIGS. 2 to 5 is embedded, according to one embodiment.

The system 6000 may include a first home 6200 in which a first power meter 6220 is located, a second home 6400 in which a second power meter 6420 is located, a third home 6600 in which a third power meter 6620 is located, a VPN server 6800, and a server of a power provider 6900.

The first power meter 6220, the second power meter 6420, and the third power meter 6620 may respectively transmit first power usage data of the first home 6200, second power usage data of the second home 6400, and third power usage data of the third home 6600 to the server 6900 of the power supplier based on the wired or wireless communication interface.

Each of the first power meter 6220, the second power meter 6420, and the third power meter 6620 may be exposed to a security threat such as a risk of hacking the power usage data and a risk of changing and manipulating the power usage data. Thus, each of the first power meter 6220, the second power meter 6420, and the third power meter 6620 may safely transmit each power usage data to the server 6900 of the power provider through the VPN tunnel.

Each SoC described above with reference to FIGS. 2 to 5 may be embedded in each of the first power meter 6220, the second power meter 6420, and the third power meter 6620. The power meter is a miniaturized device, which is difficult to be equipped with the commercial/general-purpose operating system such as the Linux and the Windows, may implement the VPN function by embedding the miniaturized SoC described above with reference to FIGS. 2 to 5 therein.

For example, the SoC 3000 of FIG. 3 may be embedded in the first power meter 6220 to encrypt the first power usage data based on the TLS-based encryption algorithm and output the encapsulated first power usage data to the VPN server 6800 through the VPN tunnel. The VPN server 6800 may decrypt the encapsulated first power usage data and transmit the decrypted first power usage data to the server 6900 of the power provider.

Each of the second power usage data and the third power usage data may also be safely transmitted to the server 6900 in the same manner as the first power usage data without the risk of hacking, falsification, or tampering.

Figure 7:
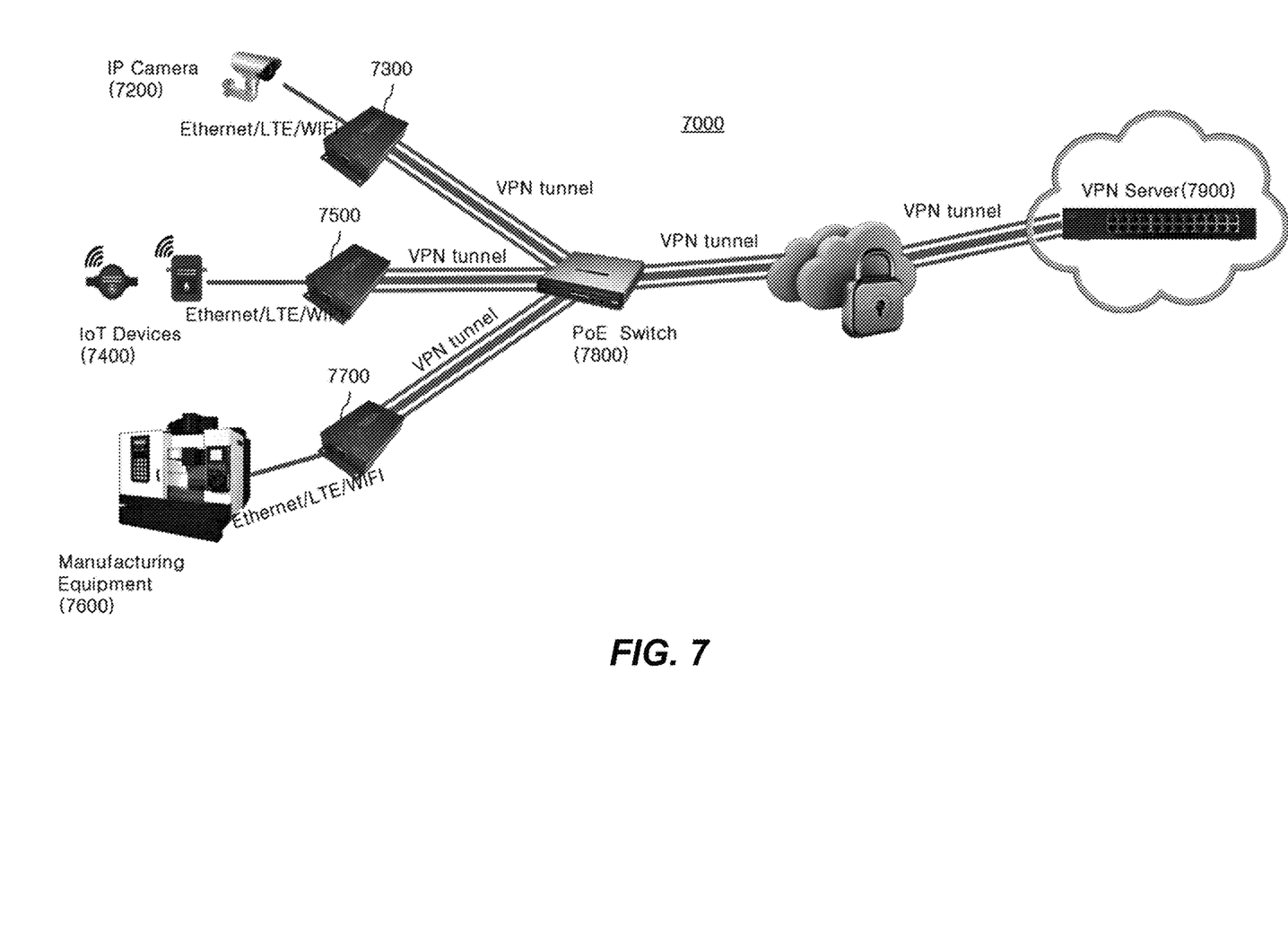
FIG. 7 illustrates a system including a VPN equipment in which a SoC of FIGS. 2 to 5 is embedded, according to one embodiment.

FIG. 7 illustrates a system including a VPN equipment in which a SoC of FIGS. 2 to 5 is embedded, according to one embodiment.

A system 7000 may include a first VPN equipment 7300 connected to an IP camera 7200 and an IP camera 7200, a second VPN equipment 7500 connected to IoT devices 7400 and IoT devices 7400, a manufacturing equipment 7600, a third VPN equipment 7700 connected to the manufacturing equipment 7600, a PoE (Power Over Ethernet) switch 7800 connected to the first VPN equipment 7300, the second VPN equipment 7500, and the third VPN equipment 7700, and a VPN server 7900 connected to the PoE switch 7800.

Each of the first VPN equipment 7300, the second VPN equipment 7500, and the third VPN equipment 7700, which includes the SoC of FIG. 2 to FIG. 5 embedded therein, may encapsulate received data and transmit the encapsulated data to the PoE switch 7800 through the VPN tunnel.

For example, the first VPN equipment 7300 may encrypt image data received from the IP camera 7200 and transmit the encrypted image data to the PoE switch 7800. According to one embodiment, the first VPN equipment 7300 may be located outside the IP camera 7200 and receive the image data through a communication channel. For example, the first VPN equipment 7300 may be equipped with an Ethernet port, and the first VPN equipment 7300 may receive the image data from the IP camera 7200 through the Ethernet port. According to one embodiment, the first VPN equipment 7300 may include at least one high-speed interface (e.g., a speed equal to 10 Mbps or higher) based on Ethernet and USB 2.0 to process the image data.

The second VPN equipment 7500 may encrypt IoT data received from the IoT devices 7400 and transmit the encrypted IoT data to the PoE switch 7800. According to one embodiment, the second VPN equipment 7500 may be located outside the IoT devices 7400 and receive the IoT data through the communication channel. For example, the second VPN device 7500 may be equipped with a Bluetooth interface, and the second VPN device 7500 may receive the IoT data from the IoT devices 7400 via the Bluetooth interface.

The third VPN equipment 7700 may encrypt various data received from the manufacturing equipment 7600 and transmit the encrypted various data to the PoE switch 7800. According to one embodiment, the third VPN equipment 7700 may be located outside the manufacturing equipment 7600 and receive the various data through a communication channel. For example, the third VPN equipment 7700 may be equipped with an Ethernet port, and the third VPN equipment 7700 may receive the various data from the manufacturing equipment 7600 via the Ethernet port.

The PoE switch 7800 may transmit data received from each of the first VPN equipment 7300, the second VPN equipment 7500, and the third VPN equipment 7700 to the VPN server 7900 through a VPN tunnel.

The above description is intended to provide exemplary configurations and operations for implementing the present invention. The technical idea of the present invention includes not only the embodiments described above but also implementations that may be obtained by simply changing or modifying the above embodiments. In addition, the technical idea of the present invention will also include implementations that may be achieved by easily changing or modifying the embodiments described above.

Since the miniaturized SoC that performs the VPN function is provided, the security channel may be formed, via the VPN, between the miniaturized and lightweight electronic device such as the IoT device or between the electronic device and the server. A security of the solution that implements the VPN function in the SoC may be verified via a national/international common criteria (CC) EAL4 rating (international standard ISO/IEC 15408) certification.

What is claimed is:

1. A system-on-chip for performing a message encryption operation based on a transport layer security (TLS), the system-on-chip comprising:
    an authentication unit configured for exchanging a key used for the message encryption operation and performing authentication for a subject to perform communication;
    an advanced encryption standard (AES) engine core configured for performing a function of encrypting a message using the key or decrypting the encrypted message; and
    a controller configured for controlling the AES engine core and the authentication unit based on a real time operating system (RTOS) and firmware for performing the message encryption operation,
    wherein the firmware includes a code or a function for replacing signal delivery performed in a commercial or general-purpose operating system for the message encryption operation with message delivery in the RTOS.

2. The system-on-chip of claim 1, wherein the authentication unit includes a circuit configured for performing an elliptic curve digital signature algorithm (ECDSA) and a Rivest Shamir Adleman (RSA) algorithm.

3. The system-on-chip of claim 1, further comprising:
    a random number generator configured for generating a random number used for the message encryption operation;
    a hash unit configured for hashing the message or the key; and
    private key storage configured for storing a private key.

4. The system-on-chip of claim 3, further comprising:
    a micro controller unit (MCU) including the AES engine core, the random number generator, and the hash unit; and
    a trusted platform module (TPM) including the authentication unit and the private key storage.

5. The system-on-chip of claim 1, further comprising a memory,
    wherein the RTOS, the firmware, and a software application for receiving an X.509 certificate are stored in the memory.

6. The system-on-chip of claim 1, wherein information about a physical or logical address indicating a memory region at which a file is capable of being input or output is recorded in the firmware.

7. An electronic device including the system-on-chip of claim 1.

8. A system for transmitting a message through a virtual private network, the system comprising:
    a client device configured for generating the message;
    a virtual private network (VPN) client configured for performing an encryption operation based on a transport layer security (TLS) on a message received from the client device through a communication channel to output an encapsulated message;
    a VPN server configured for receiving the encapsulated message from the VPN client through the VPN tunnel and for decrypting the encapsulated message; and
    a server configured for receiving the decrypted message from the VPN server, wherein the VPN client includes a system-on-chip for performing the encryption operation based on the TLS based on a real time operating system (RTOS) and firmware,
    wherein the firmware includes a code or a function for replacing signal delivery performed in a commercial or general-purpose operating system for the encryption operation based on the TLS with message delivery in the RTOS.

9. The system of claim 8, wherein the system-on-chip includes a micro controller unit (MCU),
    wherein the MCU includes:
    an advanced encryption standard (AES) engine core configured for performing a function of encrypting a message using the key or decrypting the encrypted message;
    a random number generator configured for generating a random number used for the encryption operation based on the TLS; and
    a hash unit configured for hashing the message or the key.

10. The system of claim 9, wherein the system-on-chip further includes a trusted platform module (TPM),
    wherein the TPM includes:
    a circuit configured for performing an elliptic curve digital signature algorithm (ECDSA) and a Rivest Shamir Adleman (RSA) algorithm; and
    private key storage configured for storing a private key.

11. The system of claim 8, wherein the communication channel includes at least one of an Ethernet, a long term evolution (LTE), a universal serial bus (USB), or a wireless fidelity (WIFI).

12. The system of claim 8, wherein the VPN client is embedded in the client device.

13. The system of claim 8, wherein the client device is an Internet of Things device.

14. The system of claim 8, wherein information about a physical or logical address indicating a memory region at which a file is capable of being input or output is recorded in the firmware.

* * * * *